Oct. 24, 1950  J. E. JOHANSSON  2,527,424
MULTIPLE INTERNAL-COMBUSTION ENGINES OF THE OPPOSED PISTON
TYPE WITH CLUTCHES AND CRANKSHAFT SYNCHRONIZING DEVICES
Filed Dec. 21, 1945
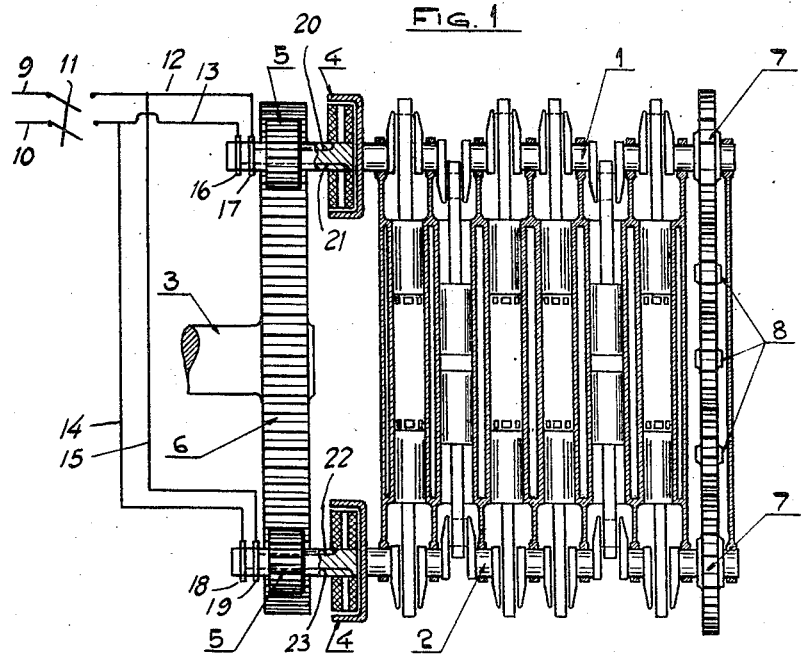
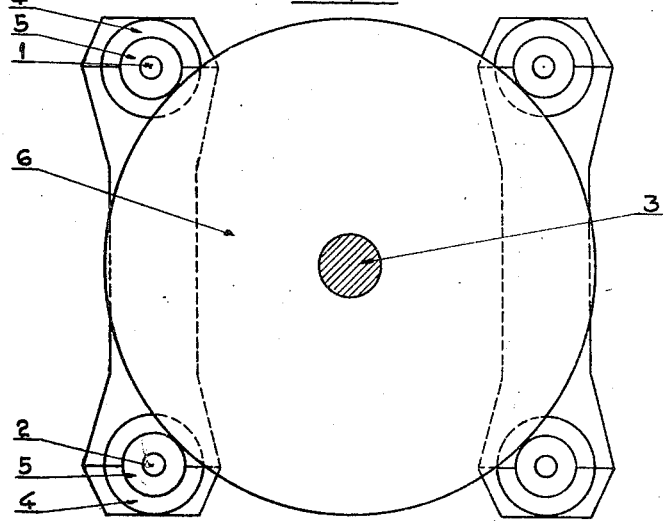
Inventor:
Johan Erik Johansson
By Cushman, Darby & Cushman
attys.

Patented Oct. 24, 1950

2,527,424

UNITED STATES PATENT OFFICE 2,527,424

MULTIPLE INTERNAL-COMBUSTION ENGINES OF THE OPPOSED PISTON TYPE WITH CLUTCHES AND CRANKSHAFT SYNCHRONIZING DEVICES

Johan Erik Johansson, Goteborg, Sweden, assignor to Aktiebolaget Gotaverken, Goteborg, Sweden, a corporation of Sweden Application December 21, 1945, Serial No. 636,312
In Sweden February 4, 1944

Section 1, Public Law 690, August 8, 1946
Patent expires February 4, 1964

3 Claims. (Cl. 60—97)

The present invention relates to double-shaft internal combustion engines of the opposed piston type, in which the engine shafts by means of reduction gears are connected to a common driven shaft. Said reduction gears normally synchronize the rotation of the shafts relative to each other. If, however, for some reason or other, for instance, in a power plant including a plurality of engines, an engine is disengaged from the reduction gears, the synchronization will cease at the same time.

It is the object of the invention to provide means by which an engine pertaining to a plant comprising a plurality of engines can be thrown out of gear and stopped even during the operation of the plant and again started and speeded up to the same speed as a running engine and thence thrown into gear without interfering with the operation of the plant.

In the annexed drawing, there is illustrated an embodiment of the invention as applied to a plant consisting of two six-cylinder internal combustion engines operating on a common driven shaft. Fig. 1 is a diagrammatic section of an engine with appertaining reduction gear and synchronizing means, and Fig. 2 is a end elevation of the plant.

Referring to the drawing, numeral 1 indicates the upper shaft and numeral 2 the lower shaft of the engine, and numeral 3 indicates the common output shaft. Each engine shaft is by means of a disengageable slipping clutch 4 connected with a pinion 5 of a reduction gear, said pinions meshing with the driven gear wheel 6 mounted on the shaft 3. The slipping clutches 4 shown are of the electromagnetic type and receive electric current from a suitable source of current through conductors 9, 10, a switch 11, conductors 12, 13 and 14, 15 and slip rings 16, 17 and 18, 19, and through conductors 20, 21 and 22, 23, respectively. As will be seen from the drawing, the clutches 4 are advantageously arranged in such a manner that they can be simultaneously thrown into or out of gear. At the ends remote from the reduction gears, the engine shafts are provided with synchronizing means. By way of example, gear wheels 7 constitute, together with intermediate gear wheels 8, a synchronizing device between the shafts. As a result thereof, the movements of the shafts are dependent upon each other, and the engine can be kept in operation even if it is disconnected from the reduction gear. The clutches moderate oscillations along the entire lengths of the crank shafts.

The simple reduction gears according to the drawing, the ratio of which is determined by the diameters of the pinions and the driven gear wheel, are particularly suitable in the present case, since both shafts or all of the shafts in a plant including a plurality of engines are operating on a common driven gear wheel. As the total output of each engine is taken out by two shafts, the length of the teeth of the gear is shorter than if the output were taken out through one shaft only, and, consequently, the reduction gears become lighter and cheaper.

The number of engines of the plant may obviously be other than that shown in the drawing, and the engines may be placed on one side or on both sides of the driven gear wheel 6.

What I claim is:

1. A power plant including at least two internal combustion engines of the opposed piston type having a common output shaft, each engine comprising two engine shafts, a reduction gear between each of said engine shafts and said common output shaft, a disengageable slipping clutch between each of said engine shafts and reduction gears, and means for synchronizing said engine shafts relative to each other.

2. A power plant including at least two internal combustion engines of the opposed piston type having a common output shaft, each engine comprising two engine shafts, a reduction gear between each of said engine shafts and said common output shaft, a disengageable slipping clutch between each of said engine shafts and reduction gears, means for simultaneously throwing said clutches into and out of gear, and means for synchronizing said two engine shafts relative to each other.

3. A power plant including at least two internal combustion engines of the opposed piston type having a common output shaft, each engine comprising two engine shafts, a reduction gear between each of said engine shafts and said common output shaft, each reduction gear having a pinion meshing directly with said common output shaft, a disengageable slipping clutch between each of said engine shafts and reduction gears, and synchronizing means consisting of a gear wheel transmission between said two engine shafts.

JOHAN ERIK JOHANSSON.

REFERENCES CITED

The following references are of record in the file of this patent:

UNITED STATES PATENTS

| Number | Name | Date |
|---|---|---|
| 891,350 | Mascord | June 23, 1908 |
| 1,308,326 | Black | July 1, 1919 |
| 1,680,017 | Fornaca | Aug. 7, 1928 |
| 1,682,358 | Sperry | Aug. 28, 1928 |
| 2,395,443 | Barraja-Frauenfelder et al. | Feb. 26, 1946 |

FOREIGN PATENTS

| Number | Country | Date |
|---|---|---|
| 387,017 | France | Apr. 27, 1908 |
| 544,947 | Great Britain | May 5, 1942 |